United States Patent
Fukaya et al.

(10) Patent No.: US 10,475,210 B2
(45) Date of Patent: Nov. 12, 2019

(54) IMAGE PROCESSING DEVICE, IMAGE PROCESSING METHOD, AND COMPUTER-READABLE RECORDING MEDIUM

(71) Applicants: NEC Solution Innovators, Ltd., Tokyo (JP); AISIN SEIKI KABUSHIKI KAISHA, Aichi (JP)

(72) Inventors: Yasutoshi Fukaya, Tokyo (JP); Satoshi Kishima, Tokyo (JP); Masanori Torii, Aichi (JP); Hiroki Inagaki, Aichi (JP); Jun Kadowaki, Aichi (JP)

(73) Assignees: NEC Solution Innovators, Ltd., Koto-ku, Tokyo (JP); AISIN SEIKI KABUSHIKI KAISHA, Kariya-shi, Aichi (JP)

( * ) Notice: Subject to any disclaimer, the term of this patent is extended or adjusted under 35 U.S.C. 154(b) by 21 days.

(21) Appl. No.: 15/579,787

(22) PCT Filed: May 27, 2016

(86) PCT No.: PCT/JP2016/065749
§ 371 (c)(1),
(2) Date: Dec. 5, 2017

(87) PCT Pub. No.: WO2016/203930
PCT Pub. Date: Dec. 22, 2016

(65) Prior Publication Data
US 2018/0174329 A1    Jun. 21, 2018

(30) Foreign Application Priority Data
Jun. 18, 2015    (JP) .................................. 2015-122909

(51) Int. Cl.
*G06T 7/90*    (2017.01)
*G06K 9/46*    (2006.01)
(Continued)

(52) U.S. Cl.
CPC ............ *G06T 7/90* (2017.01); *G06K 9/00798* (2013.01); *G06K 9/00812* (2013.01);
(Continued)

(58) Field of Classification Search
CPC .. G06T 7/90; G06T 7/136; G06T 7/11; G06K 9/00798; G06K 9/00812; G06K 9/4652
See application file for complete search history.

(56) References Cited

U.S. PATENT DOCUMENTS 4,668,979 A * 5/1987 Jüng ........................ H04N 1/54
                                                            358/515
6,035,058 A * 3/2000 Savakis ................ G06K 9/2054
                                                            382/163
(Continued)

FOREIGN PATENT DOCUMENTS

JP    5-73679 A    3/1993
JP    2009-38498 A    2/2009
(Continued)

OTHER PUBLICATIONS

Truyen et al., "Development of an annotation tool for accumulating Mokkan Images," The Computers and the Humanities Symposium, Dec. 30, 2011, pp. 249-254.
(Continued)

*Primary Examiner* — Santiago Garcia
(74) *Attorney, Agent, or Firm* — Sughrue Mion, PLLC

(57) ABSTRACT

An image processing device (10) is for extracting pixels of a specific color from an image to be processed, and includes: a pixel information extraction unit (11) that extracts values of luminance, first chrominance, and second chrominance of pixels composing the image on a pixel-by-pixel basis; a calculation processing unit (12) that calculates, on a pixel-by-pixel basis, a distance from a point defined by the extracted values to a preset reference plane in a space in
(Continued)

which the luminance, the first chrominance, and the second chrominance are set along axes that are perpendicular to one another; and a converted image generation unit (13) that generates an image in which pixels satisfying the following condition are emphasized: the distance calculated by the calculation processing unit (12) is larger than or equal to a threshold.

9 Claims, 4 Drawing Sheets

(51) Int. Cl.
| | | |
|---|---|---|
| *G06T 7/11* | (2017.01) | |
| *G06T 7/136* | (2017.01) | |
| *G06T 11/00* | (2006.01) | |
| *G06K 9/00* | (2006.01) | |

(52) U.S. Cl.
CPC .............. *G06K 9/4652* (2013.01); *G06T 7/11* (2017.01); *G06T 7/136* (2017.01); *G06T 11/001* (2013.01); *G06T 2207/10024* (2013.01)

(56) References Cited

U.S. PATENT DOCUMENTS

| | | | | |
|---|---|---|---|---|
| 6,549,655 | B1* | 4/2003 | Ikushima | G06K 9/38 382/172 |
| 7,965,870 | B2* | 6/2011 | Kobayashi | G06K 9/00798 348/148 |
| 9,916,613 | B1* | 3/2018 | Dorner | G06Q 30/0621 |
| 2002/0154833 | A1* | 10/2002 | Koch | G06K 9/4628 382/325 |
| 2005/0169521 | A1* | 8/2005 | Hel-Or | G06T 3/4015 382/167 |
| 2006/0069478 | A1* | 3/2006 | Iwama | B62D 15/0245 701/36 |
| 2007/0146500 | A1* | 6/2007 | Lee | H04N 5/235 348/226.1 |
| 2009/0123065 | A1* | 5/2009 | Kobayashi | G06K 9/00798 382/165 |
| 2009/0303336 | A1* | 12/2009 | Utsugi | G06K 9/00234 348/222.1 |
| 2010/0157280 | A1* | 6/2010 | Kusevic | G01S 7/4972 356/4.01 |
| 2010/0278422 | A1* | 11/2010 | Iketani | G06T 3/403 382/165 |
| 2010/0309315 | A1* | 12/2010 | Hogasten | H04N 5/33 348/164 |
| 2011/0052079 | A1* | 3/2011 | Tamura | G06K 9/00798 382/199 |
| 2011/0052080 | A1* | 3/2011 | Tamura | G06K 9/00798 382/201 |
| 2011/0135198 | A1* | 6/2011 | Schuler | G06T 9/00 382/166 |
| 2012/0213406 | A1* | 8/2012 | Kintou | G06K 9/3241 382/103 |
| 2013/0278788 | A1* | 10/2013 | Levy | H04N 5/14 348/222.1 |
| 2014/0206965 | A1* | 7/2014 | De Haan | A61B 5/7207 600/323 |
| 2015/0228216 | A1* | 8/2015 | Lee | G09G 3/2029 345/691 |
| 2015/0257628 | A1* | 9/2015 | Morita | A61B 1/00009 382/128 |
| 2015/0278612 | A1* | 10/2015 | Sakamoto | B62D 15/025 701/41 |
| 2015/0324100 | A1* | 11/2015 | Greenberg | G06F 17/212 715/765 |
| 2016/0005148 | A1* | 1/2016 | Mine | H04N 5/21 382/269 |
| 2016/0086050 | A1* | 3/2016 | Piekniewski | G06T 7/90 382/103 |
| 2016/0371560 | A1* | 12/2016 | Feris | G06K 9/00771 |
| 2017/0054952 | A1* | 2/2017 | Siddiqui | G02B 5/201 |
| 2017/0263139 | A1* | 9/2017 | Deng | G08B 5/06 |
| 2018/0158128 | A1* | 6/2018 | Dorner | G06Q 30/0621 |

FOREIGN PATENT DOCUMENTS

| | | |
|---|---|---|
| JP | 2012-176641 A | 9/2012 |
| JP | 2013-191966 A | 9/2013 |

OTHER PUBLICATIONS

International Search Report for PCT/JP2016/065749, dated Aug. 2, 2016 (PCT/ISA/210).

* cited by examiner

IMAGE PROCESSING DEVICE, IMAGE PROCESSING METHOD, AND COMPUTER-READABLE RECORDING MEDIUM

CROSS REFERENCE TO RELATED APPLICATIONS

This application is a National Stage of International Application No. PCT/JP2016/065749 filed May 27, 2016, claiming priority based on Japanese Patent Application No. 2015-122909, filed Jun. 18, 2015, the contents of all of which are incorporated herein by reference in their entirety.

TECHNICAL FIELD

The present invention relates to an image processing device and an image processing method for detecting a specific color, and also to a computer-readable recording medium having recorded therein a program for realizing these device and method.

BACKGROUND ART

In recent years, techniques to identify the colors of images are attracting attention in the field of image processing. For example, Patent Document 1 discloses a technique to generate chrominance information of pixels composing an image captured by a digital camera on a pixel-by-pixel basis, and extract a subject having a specific hue based on the generated chrominance information. The technique disclosed in Patent Document 1 is useful in autofocus and exposure adjustment in a digital camera.

Patent Document 2 discloses a technique to generate RGB signals from an image captured by an onboard camera, and detect a yellow portion in the captured image based on the generated RGB signals. Specifically, according to the technique disclosed in Patent Document 2, pixels that satisfy the following conditions are specified and extracted as a yellow portion: the R value is larger than the B value, the G value is larger than the B value, and a value obtained by subtracting the B value from the R value is larger than a set value. The technique disclosed in Patent Document 2 can be used in parking assistance when parking lines are painted in yellow, and in detection of road surface markings that are painted in yellow.

It is expected that the use of such techniques to extract a specific color from captured images can realize easy detection of buildings, facilities, people in distress, and so forth from, for example, aerial photographs or satellite photographs.

LIST OF PRIOR ART DOCUMENTS

Patent Documents

Patent Document 1: JP 2013-191966A
Patent Document 2: JP 2012-176641A

DISCLOSURE OF THE INVENTION

Problems to be Solved by the Invention

The technique disclosed in Patent Document 1 aims to distinguish between a background and a subject in an image taken by a digital camera. For example, this technique specifies pixels in a wide color range from purple to red. Therefore, with the technique disclosed in Patent Document 1, it is difficult to identify pixels of a specific color.

On the other hand, the technique disclosed in Patent Document 2 extracts yellow pixels based on RGB signals. Thus, this technique reduces the precision of extraction in accordance with an environmental change, such as darkening of an area around a subject to be shot. Although the technique disclosed in Patent Document 2 takes measures against an environmental change by setting extraction conditions, simply taking such measures is not enough.

An example of an object of the present invention is to solve the foregoing issues by providing an image processing device, an image processing method, and a computer-readable recording medium that can deal with an environmental change and identify pixels of a specific color in an image.

Means for Solving the Problems

In order to achieve the foregoing object, an image processing device according to one aspect of the present invention is for extracting pixels of a specific color from an image to be processed, and includes: a pixel information extraction unit that extracts values of luminance, first chrominance, and second chrominance of pixels composing the image on a pixel-by-pixel basis; a calculation processing unit that calculates, on a pixel-by-pixel basis, a distance from a point defined by the extracted values to a preset reference plane in a space in which the luminance, the first chrominance, and the second chrominance are set along axes that are perpendicular to one another; and a converted image generation unit that generates an image in which pixels satisfying the following condition are emphasized: the distance calculated by the calculation processing unit is larger than or equal to a threshold.

In order to achieve the foregoing object, an image processing method according to another aspect of the present invention is for extracting pixels of a specific color from an image to be processed, and includes: (a) a step of extracting values of luminance, first chrominance, and second chrominance of pixels composing the image on a pixel-by-pixel basis; (b) a step of calculating, on a pixel-by-pixel basis, a distance from a point defined by the extracted values to a preset reference plane in a space in which the luminance, the first chrominance, and the second chrominance are set along axes that are perpendicular to one another; and (c) a step of generating an image in which pixels satisfying the following condition are emphasized: the distance calculated in step (b) is larger than or equal to a threshold.

In order to achieve the foregoing object, a computer-readable recording medium according to still another aspect of the present invention has recorded therein a program for extracting pixels of a specific color from an image to be processed using a computer, and the program includes an instruction to cause the computer to execute: (a) a step of extracting values of luminance, first chrominance, and second chrominance of pixels composing the image on a pixel-by-pixel basis; (b) a step of calculating, on a pixel-by-pixel basis, a distance from a point defined by the extracted values to a preset reference plane in a space in which the luminance, the first chrominance, and the second chrominance are set along axes that are perpendicular to one another, and (c) a step of generating an image in which pixels satisfying the following condition are emphasized: the distance calculated in step (b) is larger than or equal to a threshold.

Advantageous Effects of the Invention

As described above, the present invention can deal with an environmental change and identify pixels of a specific color in an image.

MODE FOR CARRYING OUT THE INVENTION

Embodiment

Figure 1:
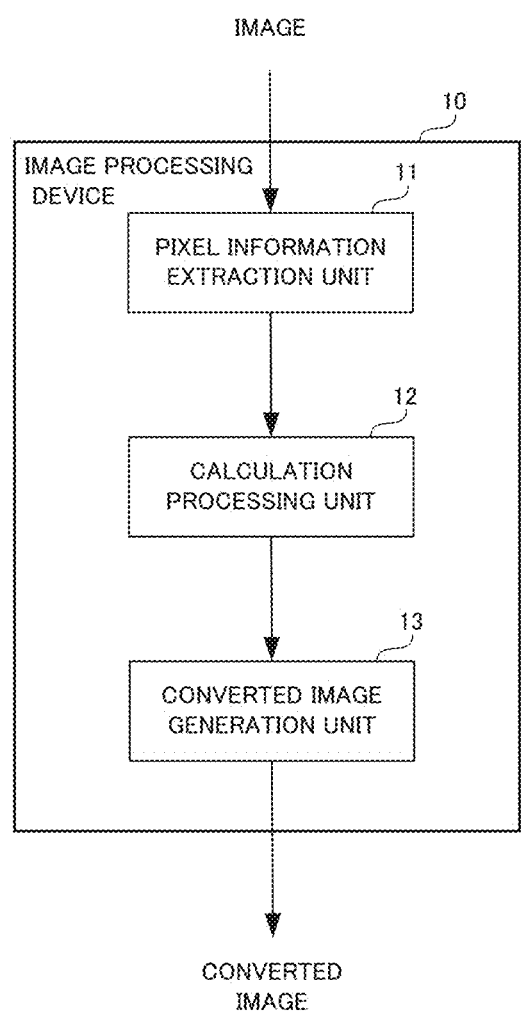
FIG. 1 is a block diagram showing a configuration of an image processing device according to an embodiment of the present invention.
Figure 2:
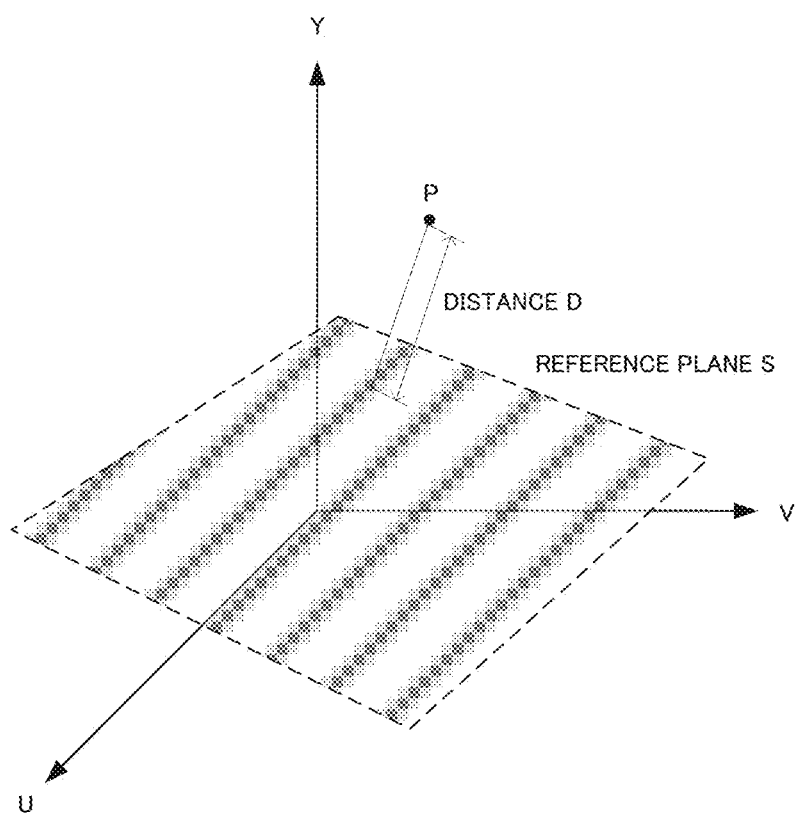
FIG. 2 shows an example of a three-dimensional space assumed in the embodiment of the present invention.
Figure 3:
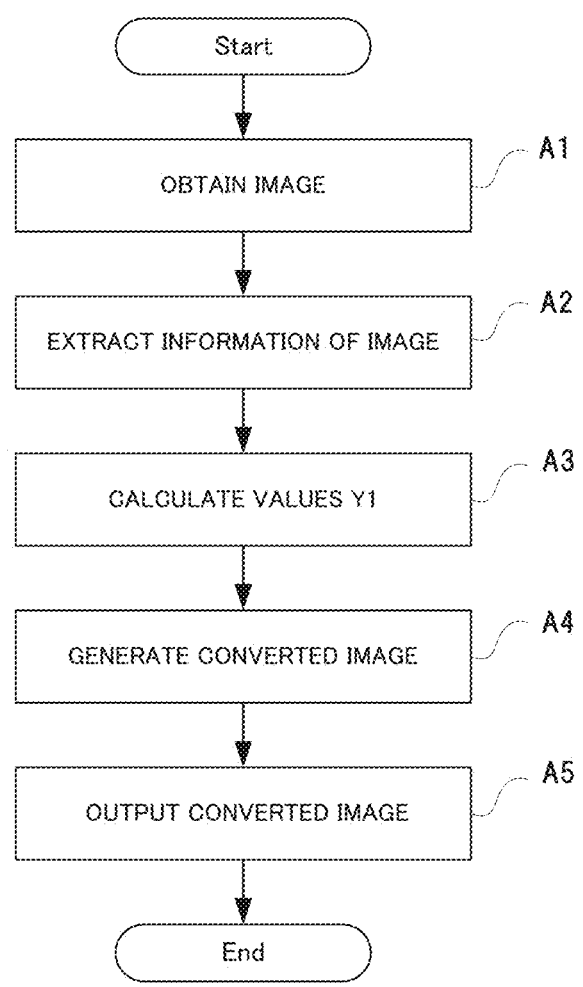
FIG. 3 is a flowchart showing the operations of the image processing device according to the embodiment of the present invention.

The following describes an image processing device according to an embodiment of the present invention with reference to FIGS. 1 to 3.
[Device Configuration]

First, a configuration of an image processing device 10 according to the present embodiment will be described using FIGS. 1 and 2. FIG. 1 is a block diagram showing the configuration of the image processing device according to the embodiment of the present invention. FIG. 2 shows an example of a three-dimensional space assumed in the embodiment of the present invention.

The image processing device 10 according to the present embodiment shown in FIG. 1 extracts pixels of a specific color from an image to be processed. As shown in FIG. 1, the image processing device 10 includes a pixel information extraction unit 11, a calculation processing unit 12, and a converted image generation unit 13.

First, the pixel information extraction unit 11 obtains an image (image data) to be processed from the outside. Then, the pixel information extraction unit 11 extracts values of luminance, first chrominance, and second chrominance of pixels composing the image on a pixel-by-pixel basis. Hereinafter, the extracted luminance, first chrominance, and second chrominance are also expressed as Y, U, and V, respectively. It will be assumed that U is derived from a value obtained by subtracting luminance Y from a B signal (blue), whereas V is derived from a value obtained by subtracting luminance Y from an R signal (red).

The calculation processing unit 12 calculates, on a pixel-by-pixel basis, a distance D from a point P defined by the extracted values to a preset reference plane S in the three-dimensional space shown in FIG. 2. Note that in the three-dimensional space shown in FIG. 2, Y, U, and V are set along the axes that are perpendicular to one another.

The converted image generation unit 13 generates an image (hereinafter, "converted image") in which pixels satisfying the following condition are emphasized: the distance D calculated by the calculation processing unit 12 is larger than or equal to a threshold. The converted image generation unit 13 also outputs the generated converted image to the outside.

As described above, the image processing device 10 can deal with an environmental change as it specifies specific pixels, that is to say, pixels of the specific color, based on luminance and chrominance of each pixel. Furthermore, as the image processing device 10 distinguishes between pixels of the specific color and pixels of other colors using the reference plane S, it can set the color of pixels to be specified by setting the reference plane.

Below is a more specific description of the configuration of the image processing device 10. Although the color of pixels to be extracted is not limited to a particular color in the present embodiment, the following describes an example in which the color of pixels to be extracted is "yellow."

In the present embodiment, the calculation processing unit 12 calculates the distance D on a pixel-by-pixel basis by substituting the extracted values into a preset calculation formula. The calculation formula used by the calculation processing unit 12 is set such that the calculated distance D is larger for pixels of the specific color than for pixels of colors other than the specific color.

Specifically, in the present embodiment, a formula including (aY+bU+cV+d) can be used as the calculation formula. In this case, the coefficients a, b, c, and d are set such that the distance D calculated using the calculation formula is larger than or equal to zero for pixels of the specific color, and smaller than zero for pixels of colors other than the specific color.

Specifically, the calculation formula is expressed as the following Expression 1, for example. It will be assumed that the distance D is equal to Y1 in Expression 1.

$$D=Y1=(aY+bU+cV+d) \quad \text{(Expression 1)}$$

In the present embodiment, the converted image generation unit 13 can generate the converted image by setting the luminance as follows. The converted image generation unit 13 sets the luminance of each pixel satisfying the following condition to zero: the value of Y1 calculated using the above Expression 1 is smaller than zero. The converted image generation unit 13 sets the luminance of each pixel satisfying the following condition to a value larger than or equal to the value of Y1 calculated using the above Expression 1: the value of Y1 is larger than or equal to zero.

Specifically, provided that Y2 denotes luminance of pixels in the converted image, the converted image generation unit 13 sets Y2=0 for each pixel satisfying the relationship Y1<0. On the other hand, for each pixel satisfying the relationship Y1≥0, the converted image generation unit 13 calculates Y2 that is larger than or equal to a sum of Y1 and luminance Y of the pixel using the following Expression 2. Note that f is an arbitrary coefficient.

$$Y2=Y1+Y\times f \quad \text{(Expression 2)}$$

If the calculation yields Y2>255, the converted image generation unit 13 sets 255 as Y2 because Y2 exceeding 255 cannot be presented on a screen. In the above Expression 2, the integral multiple of luminance Y is added so as to emphasize an entirety of an extracted portion (a portion composed of pixels of the specific color).

When the color of pixels to be extracted is "yellow," the values of a, b, c, and d in the above Expression 1 are set to fall in the following ranges, for example: a=0.00051 to 0.0080, b=−0.0057 to 0.074, c=−0.15 to −0.064, and d=9.4 to 10.9. Note that the values of a, b, c, and d are not limited to falling in these ranges as long as the reference plane S with a distance D to a defined point P can be set in the three-dimensional space shown in FIG. 2.

The above Expression 1 is a formula that indicates the plane in the three-dimensional space shown in FIG. 2. Therefore, when the colors of the image to be processed can be categorized into two different groups, the coefficients a, b, c, and d in the above Expression 1 can be calculated by extracting regions that belong to the groups and obtaining luminance at a plane (boundary) of separation in advance on a group-by-group basis. With this method, the coefficients a, b, c, and d can be obtained for each color to be extracted.

Furthermore, in order to clarity a difference between pixels of the specific color and pixels of other colors in the converted image, the above Expression 1 can be rewritten as the following Expression 3. In Expression 3, e is a coefficient that increases a distance D between a target subject and a non-target subject to clarify the extracted portion.

$$Y1=(aY+bU+cV+d)\times e \qquad \text{(Expression 3)}$$

The coefficient "e" in the above Expression 3 is specifically in a range of 1 to 25, for example. The coefficient "f" in the above Expression 2 is specifically in a range of 0 to 0.667 (=2/3), for example.

[Device Operations]

A description is now given of the operations of the image processing device 10 according to the embodiment of the present invention using FIG. 3. FIG. 3 is a flowchart showing the operations of the image processing device according to the embodiment of the present invention. In the following description, FIG. 1 will be referred to as appropriate. In the present embodiment, an image processing method is implemented by causing the image processing device 10 to operate. Therefore, the following description of the operations of the image processing device 10 applies to the image processing method according to the present embodiment.

As shown in FIG. 3, first, the pixel information extraction unit 11 obtains an image (image data) to be processed from the outside (step A1). Then, the pixel information extraction unit 11 extracts values of luminance, first chrominance, and second chrominance of pixels composing the image obtained in step A1 on a pixel-by-pixel basis (step A2). The pixel information extraction unit 11 also inputs the values of luminance, first chrominance, and second chrominance that have been obtained on a pixel-by-pixel basis to the calculation processing unit 12.

Next, the calculation processing unit 12 substitutes the values of luminance, first chrominance, and second chrominance extracted in step A2 into a preset calculation formula to calculate a value on a pixel-by-pixel basis (step A3). Specifically, using the above Expression 3, the calculation processing unit 12 calculates a value Y1 on a pixel-by-pixel basis.

Next, based on the values Y1 calculated in step A3, the converted image generation unit 13 generates a converted image in which pixels of the specific color are enhanced (step A4). Specifically, the converted image generation unit 13 generates the converted image by setting the luminance Y2 of each pixel satisfying the relationship Y1<0 to zero, and setting the luminance Y2 of each pixel satisfying the relationship Y1≥0 to a value calculated using the above Expression 2.

Thereafter, the converted image generation unit 13 outputs the converted image generated in step A4 to the outside (step A5). After step A5 is executed, processing of the image processing device 10 ends.

In the converted image output through the foregoing steps A1 to A5, the luminance of a portion of the specific color is presented, but the luminance of a portion of a color other than the specific color is not presented, that is to say, this portion is black. The converted image enables easy extraction of a portion of the specific color from a target image.

Thus, the image processing device 10 can be used in, for example, a device for detecting buildings, facilities, and so forth from aerial photographs or satellite photographs, a device for detecting road signs and road surface markings of the specific color, or a digital camera.

[Program]

It is sufficient for a program according to the embodiment of the present invention to cause a computer to execute steps A1 to A5 shown in FIG. 3. The image processing device 10 and the image processing method according to the present embodiment can be realized by installing this program in the computer and executing the installed program. In this case, a central processing unit (CPU) of the computer functions as the pixel information extraction unit 11, the calculation processing unit 12, and the converted image generation unit 13, and executes processing.

The computer that executes the program according to the present embodiment is not limited to a particular computer. Specific examples of the computer include a general-purpose computer, a computer mounted on a digital camera, a computer mounted on an automobile, and a computer mounted on an information terminal, such as a smartphone and a tablet terminal.

Figure 4:
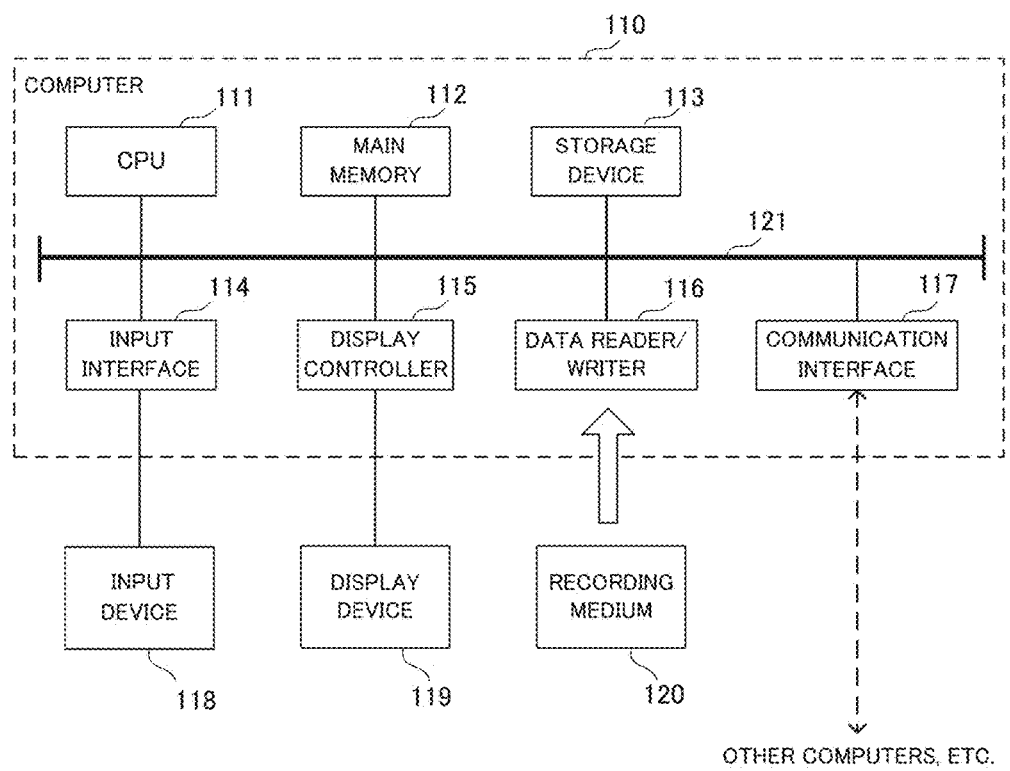
FIG. 4 is a block diagram showing an example of a computer that realizes the image processing device according to the embodiment of the present invention.

Using FIG. 4, the following describes an example of the computer that can execute the program according to the present embodiment. FIG. 4 is a block diagram showing an example of the computer that realizes the image processing device according to the embodiment of the present invention.

As shown in FIG. 4, a computer 110 includes a CPU 111, a main memory 112, a storage device 113, an input interface 114, a display controller 115, a data reader/writer 116, and a communication interface 117. These components are connected in such a manner that they can perform data communication with one another via a bus 121.

The CPU 111 performs various types of calculation by deploying the program (code) according to the present embodiment stored in the storage device 113 to the main memory 112, and executing the deployed program in a predetermined order. The main memory 112 is typically a volatile storage device, such as a dynamic random-access memory (DRAM). The program according to the present embodiment is provided while being stored in a computer-readable recording medium 120. The program according to the present embodiment may be distributed over the Internet connected via the communication interface 117.

Specific examples of the storage device 113 include a hard disk drive and a semiconductor storage device, such as a flash memory. The input interface 114 mediates data transmission between the CPU 111 and an input device 118, such as a keyboard and a mouse. The display controller 115 is connected to a display device 119, and controls display on the display device 119.

The data reader/writer 116 mediates data transmission between the CPU 111 and the recording medium 120. The data reader/writer 116 reads out the program from the recording medium 120, and writes the result of processing of the computer 110 to the recording medium 120. The communication interface 117 mediates data transmission between the CPU 11 and other computers.

Specific examples of the recording medium 120 include: a general-purpose semiconductor storage device, such as CompactFlash® (CF) and Secure Digital (SD); a magnetic storage medium, such as a flexible disk; and an optical storage medium, such as a compact disc read-only memory (CD-ROM).

Note that the image processing device 10 according to the present embodiment can also be realized using items of hardware corresponding to various components, rather than using the computer having the program installed therein. Furthermore, a part of the image processing device 10 may be realized by the program, and the remaining parts may be realized by hardware.

A part or an entirety of the foregoing embodiment can be described as, but is not limited to, the following Supplementary Notes 1 to 18.

(Supplementary Note 1)

An image processing device for extracting pixels of a specific color from an image to be processed, the image processing device including:

a pixel information extraction unit that extracts values of luminance, first chrominance, and second chrominance of pixels composing the image on a pixel-by-pixel basis;

a calculation processing unit that calculates, on a pixel-by-pixel basis, a distance from a point defined by the extracted values to a preset reference plane in a space in which the luminance, the first chrominance, and the second chrominance are set along axes that are perpendicular to one another; and a converted image generation unit that generates an image in which pixels satisfying the following condition are emphasized: the distance calculated by the calculation processing unit is larger than or equal to a threshold.

(Supplementary Note 2)

The image processing device according to Supplementary Note 1, wherein the calculation processing unit calculates the distance by substituting the extracted values into a preset formula on a pixel-by-pixel basis, and the formula is set such that the calculated distance is larger for the pixels of the specific color than for pixels of colors other than the specific color, and the image generated by the converted image generation unit emphasizes the pixels of the specific color.

(Supplementary Note 3)

The image processing device according to Supplementary Note 2, wherein provided that the luminance, the first chrominance, and the second chrominance are expressed as Y, U, and V, respectively, the formula includes $(aY+bU+cV+d)$, and a, b, c, and d in the formula are set such that the distance calculated using the formula is larger than or equal to zero for the pixels of the specific color, and smaller than zero for the pixels of colors other than the specific color.

(Supplementary Note 4)

The image processing device according to Supplementary Note 3, wherein the converted image generation unit generates the image emphasizing the pixels of the specific color by setting the luminance of each pixel satisfying the following condition to zero: the distance calculated using the formula is smaller than zero, and setting the luminance of each pixel satisfying the following condition as-is or to a larger luminance value: the distance calculated using the formula is larger than or equal to zero.

(Supplementary Note 5)

The image processing device according to Supplementary Note 4, wherein the converted image generation unit sets the luminance of each pixel satisfying the following condition to a value larger than or equal to a sum of a value of the distance calculated using the formula and the value of the luminance of the pixel: the distance is larger than or equal to zero.

(Supplementary Note 6)

The image processing device according to Supplementary Note 1, wherein the specific color is yellow.

(Supplementary Note 7)

An image processing method for extracting pixels of a specific color from an image to be processed, the image processing method including:

(a) a step of extracting values of luminance, first chrominance, and second chrominance of pixels composing the image on a pixel-by-pixel basis;

(b) a step of calculating, on a pixel-by-pixel basis, a distance from a point defined by the extracted values to a preset reference plane in a space in which the luminance, the first chrominance, and the second chrominance are set along axes that are perpendicular to one another, and (c) a step of generating an image in which pixels satisfying the following condition are emphasized: the distance calculated in step (b) is larger than or equal to a threshold.

(Supplementary Note 8)

The image processing method according to Supplementary Note 7, wherein step (b) calculates the distance by substituting the extracted values into a preset formula on a pixel-by-pixel basis, and the formula is set such that the calculated distance is larger for the pixels of the specific color than for pixels of colors other than the specific color, and the image generated in step (c) emphasizes the pixels of the specific color.

(Supplementary Note 9)

The image processing method according to Supplementary Note 8, wherein provided that the luminance, the first chrominance, and the second chrominance are expressed as Y, U, and V, respectively, the formula includes $(aY+bU+cV+d)$, and a, b, c, and d in the formula are set such that the distance calculated using the formula is larger than or equal to zero for the pixels of the specific color, and smaller than zero for the pixels of colors other than the specific color.

(Supplementary Note 10)

The image processing method according to Supplementary Note 9, wherein step (c) generates the image emphasizing the pixels of the specific color by setting the luminance of each pixel satisfying the following condition to zero: the distance calculated using the formula is smaller than zero, and setting the luminance of each pixel satisfying the following condition as-is or to a larger luminance value: the distance calculated using the formula is larger than or equal to zero.

(Supplementary Note 11)

The image processing method according to Supplementary Note 10, wherein step (c) sets the luminance of each pixel satisfying the following condition to a value larger than or equal to a sum of a value of the distance calculated using the formula and the luminance of the pixel: the distance is larger than or equal to zero.

(Supplementary Note 12)

The image processing method according to Supplementary Note 7, wherein
the specific color is yellow.

(Supplementary Note 13)

A computer-readable recording medium having recorded therein a program for extracting pixels of a specific color from an image to be processed using a computer, the program including an instruction to cause the computer to execute:

(a) a step of extracting values of luminance, first chrominance, and second chrominance of pixels composing the image on a pixel-by-pixel basis;

(b) a step of calculating, on a pixel-by-pixel basis, a distance from a point defined by the extracted values to a preset reference plane in a space in which the luminance, the first chrominance, and the second chrominance are set along axes that are perpendicular to one another, and (c) a step of generating an image in which pixels satisfying the following condition are emphasized: the distance calculated in step (b) is larger than or equal to a threshold.

(Supplementary Note 14)

The computer-readable recording medium according to Supplementary Note 13, wherein
step (b) calculates the distance by substituting the extracted values into a preset formula on a pixel-by-pixel basis, and the formula is set such that the calculated distance is larger for the pixels of the specific color than for pixels of colors other than the specific color, and
the image generated in step (c) emphasizes the pixels of the specific color.

(Supplementary Note 15)

The computer-readable recording medium according to Supplementary Note 14, wherein
provided that the luminance, the first chrominance, and the second chrominance are expressed as Y, U, and V, respectively,
the formula includes (aY+bU+cV+d), and
a, b, c, and d in the formula are set such that the distance calculated using the formula is larger than or equal to zero for the pixels of the specific color, and smaller than zero for the pixels of colors other than the specific color.

(Supplementary Note 16)

The computer-readable recording medium according to Supplementary Note 15, wherein
step (c) generates the image emphasizing the pixels of the specific color by
setting the luminance of each pixel satisfying the following condition to zero: a value calculated using the formula is smaller than zero, and
setting the luminance of each pixel satisfying the following condition as-is or to a larger luminance value: the value calculated using the formula is larger than or equal to zero.

(Supplementary Note 17)

The computer-readable recording medium according to Supplementary Note 16, wherein
step (c) sets the luminance of each pixel satisfying the following condition to a value larger than or equal to a sum of the value of the distance calculated using the formula and the luminance of the pixel: the distance is larger than or equal to zero.

(Supplementary Note 18)

The computer-readable recording medium according to Supplementary Note 13, wherein
the specific color is yellow.

Although the invention of the present application has been described thus far with reference to the embodiment, the invention of the present application is not limited to the foregoing embodiment. Various changes that can be understood by a person skilled in the art can be made to the configurations and details of the invention of the present application within the scope of the invention of the present application.

INDUSTRIAL APPLICABILITY

The present invention can deal with an environmental change and identify pixels of a specific color in an image. The present invention is useful in a variety of fields that require image processing.

REFERENCE SIGNS LIST 10 image processing device
11 pixel information extraction unit
12 calculation processing unit
13 converted image generation unit
110 computer
111 CPU
112 main memory
113 storage device
114 input interface
115 display controller
116 data reader/writer
117 communication interface
118 input device
119 display device
120 recording medium
121 bus

The invention claimed is:

1. An image processing device for extracting pixels of a specific color from an image to be processed, the image processing device comprising:
a pixel information extraction unit that extracts values of luminance, first chrominance, and second chrominance of pixels composing the image on a pixel-by-pixel basis;
a calculation processing unit that calculates, on a pixel-by-pixel basis, a distance from a point defined by the extracted values to a preset reference plane in a space in which the luminance, the first chrominance, and the second chrominance are set along axes that are perpendicular to one another; and
a converted image generation unit that generates an image in which pixels satisfying the following condition are emphasized: the distance calculated by the calculation processing unit is larger than or equal to a threshold,
wherein the calculation processing unit calculates the distance by substituting the extracted values into a preset formula on a pixel-by-pixel basis, and the formula is set such that the calculated distance is larger for the pixels of the specific color than for pixels of colors other than the specific color,
wherein the image generated by the converted image generation unit emphasizes the pixels of the specific color,
wherein provided that the luminance, the first chrominance, and the second chrominance are expressed as Y, U, and V, respectively, the formula is $D=aY+bU+cV+d$,
wherein coefficients a, b, c, and d in the formula are set such that the distance D calculated using the formula is larger than or equal to zero for the pixels of the specific color, and smaller than zero for the pixels of colors other than the specific color, and wherein the specific color is yellow.

2. The image processing device according to claim 1, wherein the converted image generation unit generates the image emphasizing the pixels of the specific color by setting the luminance of each pixel satisfying the following condition to zero: the distance calculated using the formula is smaller than zero, and setting the luminance of each pixel satisfying the following condition as-is or to a larger luminance value: the distance calculated using the formula is larger than or equal to zero.

3. The image processing device according to claim 2, wherein the converted image generation unit sets the luminance of each pixel satisfying the following condition to a value larger than or equal to a sum of a value of the distance calculated using the formula and the value of the luminance of the pixel: the distance is larger than or equal to zero.

4. An image processing method for extracting pixels of a specific color from an image to be processed, the image processing method comprising:

(a) a step of extracting values of luminance, first chrominance, and second chrominance of pixels composing the image on a pixel-by-pixel basis;

(b) a step of calculating, on a pixel-by-pixel basis, a distance from a point defined by the extracted values to a preset reference plane in a space in which the luminance, the first chrominance, and the second chrominance are set along axes that are perpendicular to one another; and (c) a step of generating an image in which pixels satisfying the following condition are emphasized: the distance calculated in step (b) is larger than or equal to a threshold, wherein step (b) calculates the distance by substituting the extracted values into a preset formula on a pixel-by-pixel basis, and the formula is set such that the calculated distance is larger for the pixels of the specific color than for pixels of colors other than the specific color, wherein the image generated by the converted image generation unit emphasizes the pixels of the specific color, wherein provided that the luminance, the first chrominance, and the second chrominance are expressed as Y, U, and V, respectively, the formula is $D=aY+bU+cV+d$, wherein coefficients a, b, c, and d in the formula are set such that the distance D calculated using the formula is larger than or equal to zero for the pixels of the specific color, and smaller than zero for the pixels of colors other than the specific color, and wherein the specific color is yellow.

5. The image processing method according to claim 4, wherein step (c) generates the image emphasizing the pixels of the specific color by setting the luminance of each pixel satisfying the following condition to zero: the distance calculated using the formula is smaller than zero, and setting the luminance of each pixel satisfying the following condition as-is or to a larger luminance value: the distance calculated using the formula is larger than or equal to zero.

6. The image processing method according to claim 5, wherein step (c) sets the luminance of each pixel satisfying the following condition to a value larger than or equal to a sum of a value of the distance calculated using the formula and the luminance of the pixel: the distance is larger than or equal to zero.

7. A non-transitory computer-readable recording medium having recorded therein a program for extracting pixels of a specific color from an image to be processed using a computer, the program including an instruction to cause the computer to execute:

(a) a step of extracting values of luminance, first chrominance, and second chrominance of pixels composing the image on a pixel-by-pixel basis;

(b) a step of calculating, on a pixel-by-pixel basis, a distance from a point defined by the extracted values to a preset reference plane in a space in which the luminance, the first chrominance, and the second chrominance are set along axes that are perpendicular to one another; and (c) a step of generating an image in which pixels satisfying the following condition are emphasized: the distance calculated in step (b) is larger than or equal to a threshold, wherein step (b) calculates the distance by substituting the extracted values into a preset formula on a pixel-by-pixel basis, and the formula is set such that the calculated distance is larger for the pixels of the specific color than for pixels of colors other than the specific color, wherein the image generated by the converted image generation unit emphasizes the pixels of the specific color, wherein provided that the luminance, the first chrominance, and the second chrominance are expressed as Y, U, and V, respectively, the formula is $D=aY+bU+cV+d$, wherein coefficients a, b, c, and d in the formula are set such that the distance D calculated using the formula is larger than or equal to zero for the pixels of the specific color, and smaller than zero for the pixels of colors other than the specific color, and wherein the specific color is yellow.

8. The non-transitory computer-readable recording medium according to claim 7, wherein step (c) generates the image emphasizing the pixels of the specific color by setting the luminance of each pixel satisfying the following condition to zero: a value calculated using the formula is smaller than zero, and setting the luminance of each pixel satisfying the following condition as-is or to a larger luminance value: the value calculated using the formula is larger than or equal to zero.

9. The non-transitory computer-readable recording medium according to claim 8, wherein step (c) sets the luminance of each pixel satisfying the following condition to a value larger than or equal to a sum of the value of the distance calculated using the formula and the luminance of the pixel: the distance is larger than or equal to zero.

* * * * *

UNITED STATES PATENT AND TRADEMARK OFFICE
CERTIFICATE OF CORRECTION

PATENT NO. : 10,475,210 B2  
APPLICATION NO. : 15/579787  
DATED : November 12, 2019  
INVENTOR(S) : Yasutoshi Fukaya et al.

Page 1 of 1

It is certified that error appears in the above-identified patent and that said Letters Patent is hereby corrected as shown below:

In the Specification

Column 6, Line 61; Delete "11" and insert --111-- therefor

Signed and Sealed this  
Twenty-fourth Day of November, 2020

Andrei Iancu  
*Director of the United States Patent and Trademark Office*